US011992078B2

(12) United States Patent
Castiglione et al.

(10) Patent No.: US 11,992,078 B2
(45) Date of Patent: May 28, 2024

(54) HEADWEAR SUSPENSION ATTACHMENT ELEMENT

(71) Applicant: 3M INNOVATIVE PROPERTIES COMPANY, St. Paul, MN (US)

(72) Inventors: David M. Castiglione, Hudson, WI (US); Michael J. Cowell, Woodbury, MN (US); Nathan A. Abel, Minneapolis, MN (US); William A. Mittelstadt, Cottage Grove, MN (US); Jill E. Gulliver, Bracknell (GB); Ian Kelsall, Wiltshire (GB); August Michael, Enskede (SE); Oskar E. Juhlin, Gustavsberg (SE); George J. Elliott, Bracknell (GB)

(73) Assignee: 3M Innovative Properties Company, St. Paul, MN (US)

( * ) Notice: Subject to any disclaimer, the term of this patent is extended or adjusted under 35 U.S.C. 154(b) by 937 days.

(21) Appl. No.: 16/088,135

(22) PCT Filed: Mar. 24, 2017

(86) PCT No.: PCT/US2017/023949
§ 371 (c)(1),
(2) Date: Sep. 25, 2018

(87) PCT Pub. No.: WO2017/172510
PCT Pub. Date: Oct. 5, 2017

(65) Prior Publication Data

US 2020/0345097 A1 Nov. 5, 2020

Related U.S. Application Data

(60) Provisional application No. 62/313,959, filed on Mar. 28, 2016.

(51) Int. Cl.
*A42B 3/14* (2006.01)
*A42B 3/28* (2006.01)
(Continued)

(52) U.S. Cl.
CPC ................ *A42B 3/288* (2013.01); *A42B 3/14* (2013.01); *A62B 18/025* (2013.01); *A62B 18/084* (2013.01)

(58) Field of Classification Search
None
See application file for complete search history.

(56) References Cited

U.S. PATENT DOCUMENTS

| | | |
|---|---|---|
| 2,055,853 A | 9/1936 | Schwartz |
| 2,062,834 A | 12/1936 | Schwartz |

(Continued)

FOREIGN PATENT DOCUMENTS

| | | |
|---|---|---|
| AU | 2008202095 | 6/2008 |
| CA | 2402743 | 10/2001 |

(Continued)

OTHER PUBLICATIONS

Annex to the European Search Report for European Application No. 17776345 dated Sep. 5, 2019.

(Continued)

*Primary Examiner* — Khoa D Huynh
*Assistant Examiner* — Grace Huang

(57) ABSTRACT

The present description provides components that allow a respiratory protection device to be secured in a position of use by attachment with a headwear suspension. In some exemplary embodiments, a harness adapter is positioned along a strap of a headwear suspension and includes a harness attachment element that may releasably attach to a strap component of a respiratory harness assembly.

15 Claims, 8 Drawing Sheets

(51) Int. Cl.
*A62B 18/02* (2006.01)
*A62B 18/08* (2006.01)

(56) References Cited

U.S. PATENT DOCUMENTS 2,168,695 A 8/1939 Asari
2,235,624 A 3/1941 Schwartz
2,787,333 A 4/1957 Boone
2,867,812 A * 1/1959 Roth .................... A62B 18/084 2/9
3,167,070 A 1/1965 Silverman
3,232,290 A 2/1966 Nicolai
3,594,816 A 7/1971 Webb
3,605,204 A 9/1971 Amundsen
3,703,750 A 11/1972 Irwin, Jr.
3,879,586 A 4/1975 DuRocher
3,898,700 A 8/1975 Davison
4,224,694 A 9/1980 Palmaer
4,276,657 A 7/1981 Montesi
4,390,765 A 6/1983 Sado
4,414,973 A 11/1983 Matheson
4,464,797 A 8/1984 Glassman
4,555,815 A 12/1985 Walther
4,562,837 A 1/1986 Schlobohm
4,574,799 A 3/1986 Warncke
4,604,509 A 8/1986 Clancy
4,764,989 A 8/1988 Bourgeois
4,790,306 A 12/1988 Braun
4,817,596 A * 4/1989 Gallet .................... A42B 3/288 128/201.24
4,905,683 A 3/1990 Cronjaeger
4,921,512 A 5/1990 Maryyanek
4,932,399 A 6/1990 Cappa
4,981,134 A 1/1991 Courtney
5,062,421 A 11/1991 Burns
5,086,768 A 2/1992 Niemeyer
5,148,803 A 9/1992 Schlobohm
5,154,168 A 10/1992 Schlobohm
5,199,780 A 4/1993 Ekman
5,291,880 A * 3/1994 Almovist ............... A42B 3/288 2/5
5,299,448 A 4/1994 Maryyanek
5,372,130 A 12/1994 Stern
RE35,062 E 10/1995 Brostrom
5,501,213 A 3/1996 Jackson
5,505,197 A 4/1996 Scholey
5,515,846 A 5/1996 Drews
5,540,218 A 7/1996 Jones
5,555,569 A 9/1996 Lane
5,579,761 A 12/1996 Yuschak
5,592,935 A 1/1997 Elstran
5,611,925 A 3/1997 Yasue
5,647,356 A 7/1997 Osendorf
5,647,357 A 7/1997 Barnett
5,659,296 A 8/1997 Debe
5,666,663 A 9/1997 Bolle
5,666,949 A 9/1997 Debe
5,669,375 A 9/1997 Dahrendorf
5,687,767 A 11/1997 Bowers
5,732,695 A 3/1998 Metzger
5,803,076 A 9/1998 Myers
5,924,420 A 7/1999 Reischel
5,937,439 A 8/1999 Barthold
5,937,857 A 8/1999 Caterini
5,940,891 A 8/1999 Lane
5,967,142 A 10/1999 Dorcheh
5,975,079 A 11/1999 Hellings
6,016,802 A 1/2000 Jackson
6,016,804 A 1/2000 Gleason
6,167,882 B1 1/2001 Almqvist
6,196,223 B1 3/2001 Belfer
6,206,003 B1 3/2001 Burch
6,216,693 B1 4/2001 Rekow
6,269,814 B1 8/2001 Blaszczykiewicz
6,298,849 B1 10/2001 Scholey
6,345,620 B2 2/2002 Salapow
6,408,845 B1 6/2002 Pereira
6,418,928 B1 7/2002 Ewick
6,460,539 B1 10/2002 Japuntich
6,470,886 B1 10/2002 Jestrabek-Hart
6,490,729 B1 12/2002 Dondero
6,550,479 B1 4/2003 Duxbury
6,575,165 B1 6/2003 Cook
6,584,976 B2 7/2003 Japuntich
6,659,102 B1 12/2003 Sico
6,701,925 B1 3/2004 Resnick
6,712,072 B1 3/2004 Lang
6,732,733 B1 5/2004 Brostrom
6,761,169 B2 7/2004 Eswarappa
6,793,702 B2 9/2004 Eswarappa
6,817,362 B2 11/2004 Gelinas
6,854,464 B2 2/2005 Mukaiyama
6,874,499 B2 4/2005 Viner
6,883,518 B2 4/2005 Mittelstadt
6,886,559 B2 5/2005 McDonald
6,928,657 B2 8/2005 Bell
6,997,206 B1 2/2006 Klockseth
7,025,060 B1 4/2006 Nicholson
7,059,326 B2 6/2006 Heidmann
7,100,608 B2 9/2006 Brewer
7,101,412 B2 9/2006 Gossweiler
7,114,496 B1 10/2006 Resnick
7,118,608 B2 10/2006 Lovell
7,121,279 B2 10/2006 Dennis
7,158,822 B2 1/2007 Payne, Jr.
RE39,493 E 2/2007 Yuschak
7,171,966 B2 2/2007 Schrader
7,188,622 B2 3/2007 Martin
7,213,595 B2 5/2007 Capon
7,296,568 B2 11/2007 Capon
7,302,951 B2 12/2007 Mittelstadt
7,320,722 B2 1/2008 Mittelstadt
7,353,826 B2 4/2008 Sleeper
7,419,526 B2 9/2008 Greer
7,464,705 B2 12/2008 Tanizawa
7,543,584 B2 6/2009 Brookman
7,559,323 B2 7/2009 Hacke
7,584,751 B1 9/2009 Brooks, Jr.
7,587,929 B2 9/2009 Zielinski
7,650,884 B2 1/2010 Flannigan
7,669,599 B2 3/2010 Gunaratnam
7,762,258 B2 7/2010 Zollinger
7,827,990 B1 11/2010 Melidis
7,836,886 B2 11/2010 McDonald
7,849,856 B2 12/2010 Mittelstadt
7,866,010 B2 1/2011 Schmidtke
7,866,319 B2 1/2011 Penton
7,908,668 B2 3/2011 Folkesson
7,997,275 B2 8/2011 Quinn
8,006,691 B2 8/2011 Kenyon
8,011,368 B2 9/2011 Crutchfield
8,015,626 B2 9/2011 Grassl
8,066,006 B2 11/2011 Daugaard
8,069,853 B2 12/2011 Tilley
8,104,472 B2 1/2012 Henderson
8,118,026 B2 2/2012 Gebrewold
8,176,918 B2 5/2012 Teng
8,266,724 B2 9/2012 Grilliot
8,267,088 B2 9/2012 Steindorf
8,272,382 B2 9/2012 Howard
8,291,906 B2 10/2012 Kooij
8,312,876 B2 11/2012 Mutze
8,327,850 B2 12/2012 Ng
8,336,547 B1 12/2012 Ritchie
8,342,180 B2 1/2013 Martin
8,365,771 B2 2/2013 Xue
8,402,966 B2 3/2013 Morgan, III
8,402,971 B2 3/2013 Scheiner
8,443,806 B2 5/2013 Morelli
8,460,423 B2 6/2013 Legare
8,496,005 B2 7/2013 McDonald
8,505,536 B2 * 8/2013 Kielow ................ A62B 18/084 128/206.28
8,528,559 B2 9/2013 Crutchfield

(56) References Cited

U.S. PATENT DOCUMENTS

| | | | | |
|---|---|---|---|---|
| 8,550,084 | B2 | 10/2013 | Ng | |
| 8,573,201 | B2 | 11/2013 | Rummery | |
| 8,631,792 | B2 | 1/2014 | Ho | |
| 8,678,003 | B2 | 3/2014 | Darkin | |
| 8,708,708 | B1 | 4/2014 | Carideo | |
| 8,720,443 | B2 | 5/2014 | Kooij | |
| 8,770,195 | B2 | 7/2014 | Stone | |
| 8,839,788 | B2 | 9/2014 | Betz | |
| 9,095,800 | B2 | 8/2015 | Symons | |
| 9,149,669 | B2 | 10/2015 | Cowell | |
| 9,439,467 | B2 * | 9/2016 | Stiff | A42B 3/04 |
| 9,474,319 | B2 * | 10/2016 | Ahlgren | A42B 3/14 |
| 2001/0013347 | A1 | 8/2001 | Rekow | |
| 2002/0195108 | A1 | 12/2002 | Mittelstadt | |
| 2002/0195109 | A1 | 12/2002 | Mittelstadt | |
| 2003/0200969 | A1 | 10/2003 | Kintzel | |
| 2003/0217752 | A1 | 11/2003 | Muller | |
| 2004/0003810 | A1 | 1/2004 | Templeton | |
| 2004/0025880 | A1 | 2/2004 | Capon | |
| 2005/0085799 | A1 | 4/2005 | Luria | |
| 2005/0126572 | A1 | 6/2005 | Gosweiler | |
| 2006/0076012 | A1 | 4/2006 | Tanizawa | |
| 2006/0225738 | A1 | 10/2006 | Afentoulopoulos | |
| 2006/0283453 | A1 | 12/2006 | Haddad | |
| 2006/0283455 | A1 | 12/2006 | Walker | |
| 2007/0157439 | A1 | 7/2007 | Schmidtke | |
| 2007/0272169 | A1 | 11/2007 | Barney | |
| 2008/0135050 | A1 | 6/2008 | Hitchcock | |
| 2008/0178884 | A1 | 7/2008 | Gerson | |
| 2008/0245364 | A1 | 10/2008 | Patterson | |
| 2009/0000624 | A1 | 1/2009 | Lee | |
| 2009/0044808 | A1 | 2/2009 | Guney | |
| 2009/0065729 | A1 | 3/2009 | Worboys | |
| 2009/0078264 | A1 | 3/2009 | Martin | |
| 2009/0107515 | A1 | 4/2009 | Gavriely | |
| 2009/0139526 | A1 | 6/2009 | Melidis | |
| 2009/0188506 | A1 | 7/2009 | Duke | |
| 2009/0217926 | A1 | 9/2009 | Hine | |
| 2009/0235934 | A1 | 9/2009 | Martin | |
| 2009/0250060 | A1 | 10/2009 | Hacke | |
| 2009/0266361 | A1 | 10/2009 | Bilger | |
| 2009/0268153 | A1 | 10/2009 | Wang-Lee | |
| 2010/0012692 | A1 * | 1/2010 | Harris | A42B 3/04 224/181 |
| 2010/0108067 | A1 | 5/2010 | Walker | |
| 2010/0132714 | A1 | 6/2010 | Morelli | |
| 2010/0206311 | A1 | 8/2010 | Flannigan | |
| 2010/0218761 | A1 | 9/2010 | Flannigan | |
| 2010/0224194 | A1 | 9/2010 | Walker | |
| 2010/0269833 | A1 | 10/2010 | Gillotin | |
| 2010/0307506 | A1 | 12/2010 | Kielow | |
| 2010/0313891 | A1 | 12/2010 | Veliss | |
| 2010/0319701 | A1 | 12/2010 | Connell | |
| 2011/0000481 | A1 | 1/2011 | Gumaste | |
| 2011/0100372 | A1 | 5/2011 | Betz | |
| 2011/0240027 | A1 | 10/2011 | Billingsley | |
| 2011/0259335 | A1 | 10/2011 | Sullivan | |
| 2011/0290253 | A1 | 12/2011 | McAuley | |
| 2011/0314595 | A1 | 12/2011 | Kobayashi | |
| 2012/0000465 | A1 | 1/2012 | Cavaliere | |
| 2012/0024289 | A1 | 2/2012 | Johnstone | |
| 2012/0042878 | A1 | 2/2012 | Woo | |
| 2012/0080035 | A1 | 4/2012 | Guney | |
| 2012/0167890 | A1 | 7/2012 | Insley | |
| 2012/0168658 | A1 | 7/2012 | Insley | |
| 2012/0174922 | A1 | 7/2012 | Virr | |
| 2012/0199130 | A1 | 8/2012 | Euvrard | |
| 2012/0204879 | A1 | 8/2012 | Cariola | |
| 2012/0234326 | A1 | 9/2012 | Mazzone | |
| 2012/0260920 | A1 | 10/2012 | Choi | |
| 2013/0004358 | A1 | 1/2013 | Underwood, Jr. | |
| 2013/0104900 | A1 | 5/2013 | Tobias | |
| 2013/0125896 | A1 | 5/2013 | Dwyer | |
| 2013/0133628 | A1 | 5/2013 | Fornara | |
| 2013/0133664 | A1 | 5/2013 | Startare | |
| 2013/0180523 | A1 | 7/2013 | Huggins | |
| 2013/0186394 | A1 | 7/2013 | Hallett | |
| 2013/0199520 | A1 | 8/2013 | Dhuper | |
| 2013/0228184 | A1 | 9/2013 | Lee | |
| 2013/0239972 | A1 | 9/2013 | McAuley | |
| 2013/0269513 | A1 | 10/2013 | Estirado Vera | |
| 2013/0298775 | A1 | 11/2013 | Fiet | |
| 2013/0319420 | A1 | 12/2013 | Danford | |
| 2013/0327323 | A1 | 12/2013 | Rubin | |
| 2014/0007888 | A1 | 1/2014 | Sanchez Talero | |
| 2014/0076325 | A1 | 3/2014 | Rosert | |
| 2014/0096768 | A1 | 4/2014 | Lee | |
| 2014/0096774 | A1 | 4/2014 | Olsen | |
| 2014/0109301 | A1 * | 4/2014 | Hall | A42B 3/142 2/416 |
| 2014/0190476 | A1 | 7/2014 | Stinton | |
| 2014/0216447 | A1 | 8/2014 | Kihlberg | |
| 2014/0216472 | A1 | 8/2014 | Brace | |
| 2014/0216473 | A1 | 8/2014 | Dwyer | |
| 2014/0216474 | A1 | 8/2014 | Mittelstadt | |
| 2014/0216475 | A1 | 8/2014 | Blomberg | |
| 2014/0216476 | A1 | 8/2014 | Brace | |
| 2014/0251327 | A1 | 9/2014 | Mittelstadt | |
| 2014/0261437 | A1 | 9/2014 | Catanzarite | |
| 2014/0345607 | A1 | 11/2014 | Skov | |
| 2015/0107596 | A1 | 4/2015 | Mashiko | |
| 2015/0136142 | A1 | 5/2015 | Blomberg | |

FOREIGN PATENT DOCUMENTS

| | | | | |
|---|---|---|---|---|
| CN | 1040508 | | 3/1990 | |
| CN | 2800855 | | 8/2006 | |
| CN | 102233160 | | 11/2011 | |
| CN | 202364901 | | 8/2012 | |
| CN | 203194645 | | 9/2013 | |
| CN | 203235112 | | 10/2013 | |
| CN | 203290282 | | 11/2013 | |
| CN | 203467742 | | 3/2014 | |
| CN | 104544685 | | 4/2015 | |
| CN | 204306113 | | 5/2015 | |
| DE | 2645008 | | 4/1978 | |
| DE | 4037034 | A1 * | 5/1992 | A42B 3/04 |
| DE | 10057473 | | 5/2002 | |
| DE | 102007063464 | B3 * | 6/2009 | A42B 3/288 |
| DE | 202014105242 | | 6/2015 | |
| EP | 471264 | | 2/1992 | |
| EP | 2017508 | | 1/2009 | |
| FR | 2607916 | | 6/1988 | |
| FR | 2854575 | | 11/2004 | |
| FR | 2903864 | | 1/2008 | |
| FR | 2906670 | | 4/2008 | |
| GB | 472897 | | 9/1937 | |
| GB | 591531 | | 8/1947 | |
| GB | 861574 | | 2/1961 | |
| GB | 1048258 | | 11/1966 | |
| GB | 1511303 | | 5/1978 | |
| GB | 2388787 | | 11/2003 | |
| GB | 2472835 | | 2/2011 | |
| JP | 0418581 | | 4/1992 | |
| JP | 6099947 | | 4/1994 | |
| JP | 11151312 | | 6/1999 | |
| JP | 2001-104364 | | 4/2001 | |
| JP | 2001-104501 | | 4/2001 | |
| JP | 2006-346269 | | 12/2006 | |
| JP | 2011-055896 | | 3/2011 | |
| JP | 2011-246860 | | 12/2011 | |
| JP | 5610274 | | 12/2011 | |
| JP | 2012-040336 | | 3/2012 | |
| KR | 100773460 | | 11/2007 | |
| KR | 2012-0000355 | | 1/2012 | |
| WO | WO 2002-093045 | | 11/2002 | |
| WO | WO 2003-090873 | | 11/2003 | |
| WO | WO 2003-099385 | | 12/2003 | |
| WO | WO 2006-114505 | | 11/2006 | |
| WO | WO 2006-129028 | | 12/2006 | |
| WO | WO 2006-135231 | | 12/2006 | |
| WO | WO 2008-082415 | | 7/2008 | |
| WO | WO 2008-134905 | | 11/2008 | |
| WO | WO 2010-095168 | | 8/2010 | |

(56) References Cited

FOREIGN PATENT DOCUMENTS

| | | |
|---|---|---|
| WO | WO 2012-100116 | 7/2012 |
| WO | WO 2013-187278 | 12/2013 |
| WO | WO 2013-187279 | 12/2013 |
| WO | WO 2014-120500 | 8/2014 |
| WO | WO 2014-120527 | 8/2014 |
| WO | WO 2014-120597 | 8/2014 |
| WO | WO 2015-073414 | 5/2015 |
| WO | WO 2017-172358 | 10/2017 |
| WO | WO 2017-172361 | 10/2017 |

OTHER PUBLICATIONS

"Chemical Cartridge Respirators," Koken Website, 2007 [retrieved from the Internet on Feb. 19, 2016], URL<http://www.koken-ltd.co.jp/english/chemicalcartridgerespirators.htm>, 5 pages.

"Particulate Respirators," Koken Website, 2007 [retrieved from the Internet on Feb. 19, 2016] URL<http://www.kokenltd.co.jp/english/particulaterespirators.htm>, 4 pages.

"Respirator Set / Options," Koken Website, 2007 [retrieved from the Internet on Jun. 28, 2016] URL<http://www.koken-ltd.co.jp/english/respiratorset.htm>, 2 pages.

* cited by examiner

HEADWEAR SUSPENSION ATTACHMENT ELEMENT

CROSS REFERENCE TO RELATED APPLICATIONS

This application is a national stage filing under 35 U.S.C. 371 of PCT/US2017/023949, filed Mar. 24, 2017, which claims the benefit of U.S. Provisional Application No. 62/313,959, filed Mar. 28, 2016, the disclosure of which is incorporated by reference in its/their entirety herein.

TECHNICAL FIELD

This disclosure describes devices and systems for supporting a respiratory protection device, and in some embodiments, adapter devices for attaching a respirator harness to a head suspension.

BACKGROUND

Respirator protection devices that cover a user's nose and mouth, for example, and provide breathable air to a wearer are well known. Respiratory protection devices often include a mask body covering the nose, mouth and/or other portions of the head and neck. Clean air is made available to a wearer from one or more breathable air sources, such as a filter cartridge. In negative pressure respiratory protection devices, air may be drawn through a breathable air source by a wearer by a negative pressure generated by a wearer during inhalation. In powered air devices, a fan or other powered unit may assist in delivering air to a user.

Various strap configurations and harness assemblies have been provided for positioning and maintain a respiratory protection device over the nose and mouth of a wearer. For example, some harness assemblies may include one or more tensioned straps that pass behind a wearer's neck such that the respiratory protection device is drawn over the wearer's nose and mouth. In many environments, use of personal protective equipment in combination with a respiratory protection device may be desired or required by local regulations. Combining multiple items of personal protective equipment, however, can be perceived as bulky and obtrusive, or otherwise uncomfortable to a wearer over prolonged periods of use, or cannot readily be achieved without modification or adjustment of one or more items of personal protective equipment.

SUMMARY

Particular embodiments described herein provide a respiratory protection device harness adapter including first and second major surfaces having an upper edge region and a lower edge region, a first suspension attachment protrusion proximate the upper edge region, a second suspension attachment protrusion proximate the lower edge region, and a harness attachment element configured to releasably attach a strap component of a respiratory harness assembly. The first and second suspension attachment protrusions are spaced to releasably attach to a head suspension of a headwear article.

Implementations can include any, all, or none of the following features. The harness attachment element may extend downwardly from the lower edge region. The first and second suspension attachment protrusions may extend outwardly from the first major surface. The first suspension attachment protrusion may be configured to attach around an upper edge of the head suspension of the headwear article. The first and second suspension attachment protrusions may be spaced to define a channel configured to receive the head suspension of the headwear article. The second major surface may be configured to contact a wearer's head and is free of projections extending from the second major surface. The first and second major surfaces may be separated by a thickness (t), and thickness (t) is between 0.25 mm and 4 mm. The harness adapter may include a lateral stability element configured to contact the head suspension of the headwear article and prevent relative motion between the head suspension and the adapter along a longitudinal axis of the head suspension. The lateral stability element may include a post configured to extend through an opening in the head suspension. The lateral stability element may include an adhesive. The strap attachment element may include a hook. The hook may be open outwardly from the first major surface. The hook may be angled relative to a vertical axis when the adapter is attached to the head suspension. The first major surface may be configured to contact an inner surface of the head suspension.

In some embodiments, a respiratory protection assembly is provided including a hardhat having a hardhat suspension configured to support the hardhat on a wearer's head, the hardhat suspension including a lateral strap configured to extend at least partially along a side of a wearer's head, a respirator including a harness assembly, the harness assembly including first and second strap portions on opposite sides of the respirator, and first and second harness adapters. Each harness adapter may include first and second major surfaces having an upper edge region and a lower edge region, a first suspension attachment protrusion proximate the upper edge region, a second suspension attachment protrusion proximate the lower edge region, and a harness attachment element extending downwardly from the lower edge region and configured to releasably attach to the first or second strap portions of the harness assembly. The first and second suspension attachment protrusions may be configured to contact opposing sides of the lateral strap of the hardhat suspension.

Implementations can include any, all, or none of the following features. The first and second suspension attachment protrusions may extend outwardly from the first major surface. The first harness adapter may be a mirror of the second harness adapter. The first and second suspension attachment protrusions may be configured to attach around upper and lower edges of the lateral strap. The first and second suspension attachment protrusions may be spaced to define a channel configured to receive the lateral strap. The second major surface may be configured to contact the wearer's head and may be free of outwardly extending projections. The second major surface may be configured to contact an inner surface of the hardhat suspension. The first and second major surfaces may be separated by a thickness (t), and thickness (t) may be between 0.25 mm and 4 mm. The first and second harness adapters may include a lateral stability element configured to contact the hardhat suspension of the headwear article and prevent relative motion between the hardhat suspension and the adapter along a longitudinal axis of the hardhat suspension. The lateral stability element may include a post configured to extend through an opening in the hardhat suspension. The lateral stability element may include an adhesive. The harness attachment element may include a hook. The hook may be open outwardly from the first surface. The hook may be angled relative to a vertical axis when the adapter is attached to the hardhat suspension. The first and second strap portions may include a loop configured to engage with the hook of the first and second harness adapters.

In some embodiments, a respiratory protection device harness assembly is provided, including a hardhat having a hardhat suspension configured to support the hardhat on a wearer's head, the hardhat suspension including one or more lateral straps positionable on opposing sides of the wearer's head during use, a respirator including a harness assembly, the harness assembly including first and second strap portions on opposite sides of the respirator, a first unitary harness adapter including means for releasably attaching the first unitary harness adapter to the lateral strap of the hardhat suspension and means for releasably attaching the first unitary harness adapter to the first strap portion, and a second unitary harness adapter including means for releasably attaching the second unitary harness adapter to the lateral strap of the hardhat suspension and means for releasably attaching the second unitary harness adapter to the second strap portion.

In some embodiments, a respiratory protection assembly is provided, including a hardhat having a hardhat suspension configured to support the hardhat on a wearer's head, the hardhat suspension including a lateral strap configured to extend at least partially along a side of a wearer's head, a respirator including a harness assembly, the harness assembly including first and second strap portions on opposite sides of the respirator, and first and second harness attachment elements configured to releasably attach to the first or second lateral strap portions of the harness assembly. The first and second harness attachment elements are integral with the lateral strap and form an angle with the lateral strap that is less than 90°.

Implementations can include any, all, or none of the following features. The first and second strap attachment elements may extend downwardly from a lower edge region of the lateral strap. The hardhat suspension may include a rear strap portion positionable at a rear of the wearer's head, and third and fourth strap attachment elements may extend from the rear strap portion that are configured to releasably attach to a third and fourth strap portions of the harness assembly. The first and second harness attachment elements may be fixed in position relative to the lateral straps. The strap attachment element may include a hook. The hook may be open outwardly from an outer surface of the lateral strap. The first and second strap portions may include a loop configured to engage with the hook.

The details of one or more implementations are set forth in the accompanying drawings and the description below. The above summary is not intended to describe each disclosed embodiment or every implementation. Other features and advantages will be apparent from the description and drawings, and from the claims.

DESCRIPTION OF DRAWINGS

The present description is further provided with reference to the appended Figures, wherein like structure is referred to be like numerals throughout the several views, and wherein.

While the above-identified figures set forth various embodiments of the disclosed subject matter, other embodiments are also contemplated. In all cases, this disclosure presents the disclosed subject matter by way of representation and not limitation. It should be understood that numerous other modifications and embodiments can be devices by those skilled in the art which fall within the scope and spirit of the principles of this disclosure.

DETAILED DESCRIPTION OF ILLUSTRATIVE EMBODIMENTS

In some embodiments, the present disclosure provides components that allow a respiratory protection device to be secured in a position of use by attachment with a headwear suspension. For example, headwear, such as hard hats, helmets, fire fighter helmets, shields, such as welding shields and grinding shields, and the like are often supported by a head suspension that maintains the headgear in position and, in some cases, supports the helmet off the wearer's head. A headwear device harness attachment element may connected to the head suspension to allow attachment of a harness assembly strap of a respiratory protection device. The harness attachment element may allow the respiratory protection device to be secured in a position of use to the head suspension without interference with the headwear, and while allowing the harness assembly to be easily donned and doffed without removing the headwear, as described in greater detail herein.

Figure 1:
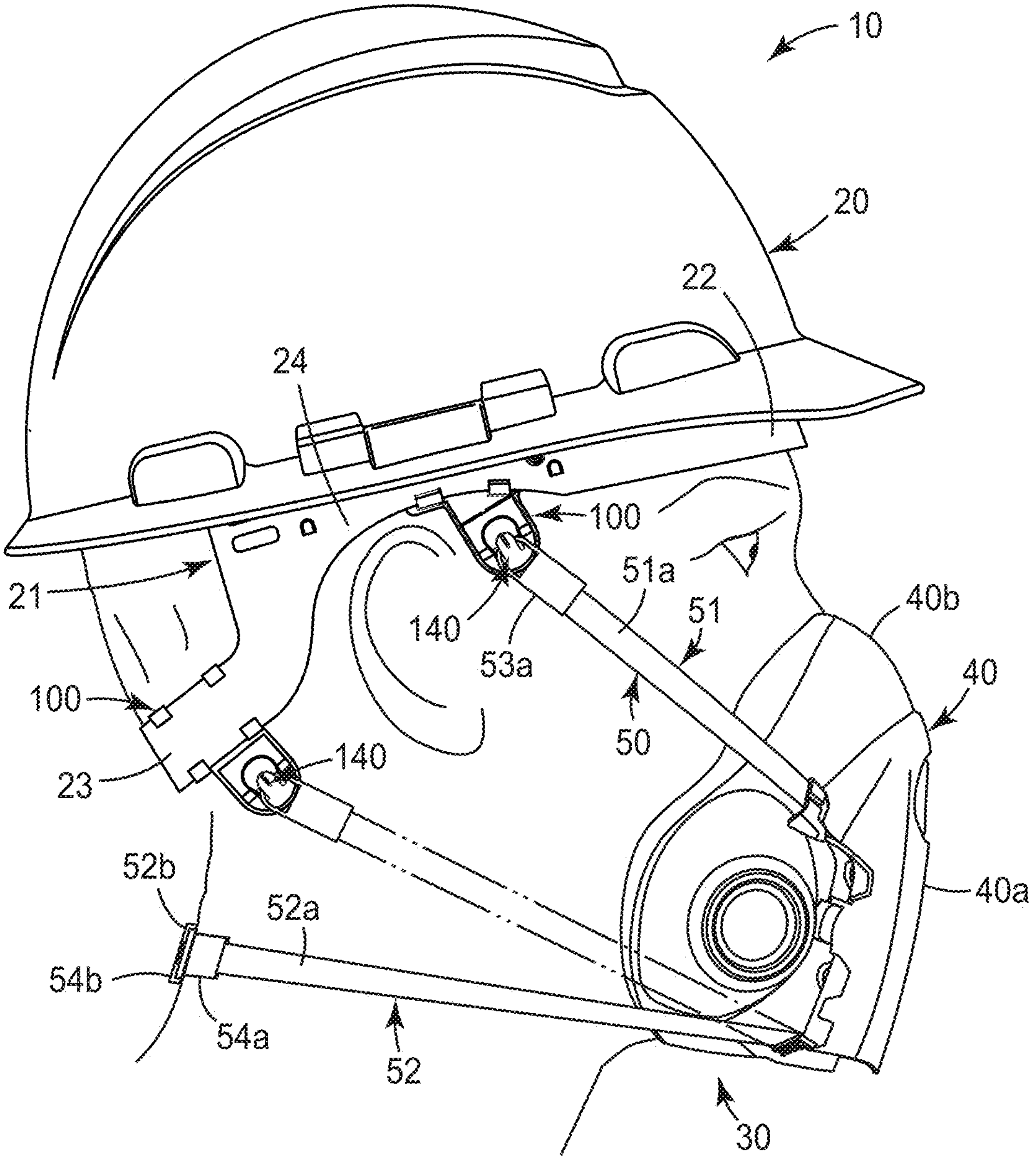
FIG. 1 is a side view of an exemplary personal protective device including a harness adapter in accordance with some embodiments.
Figure 2:
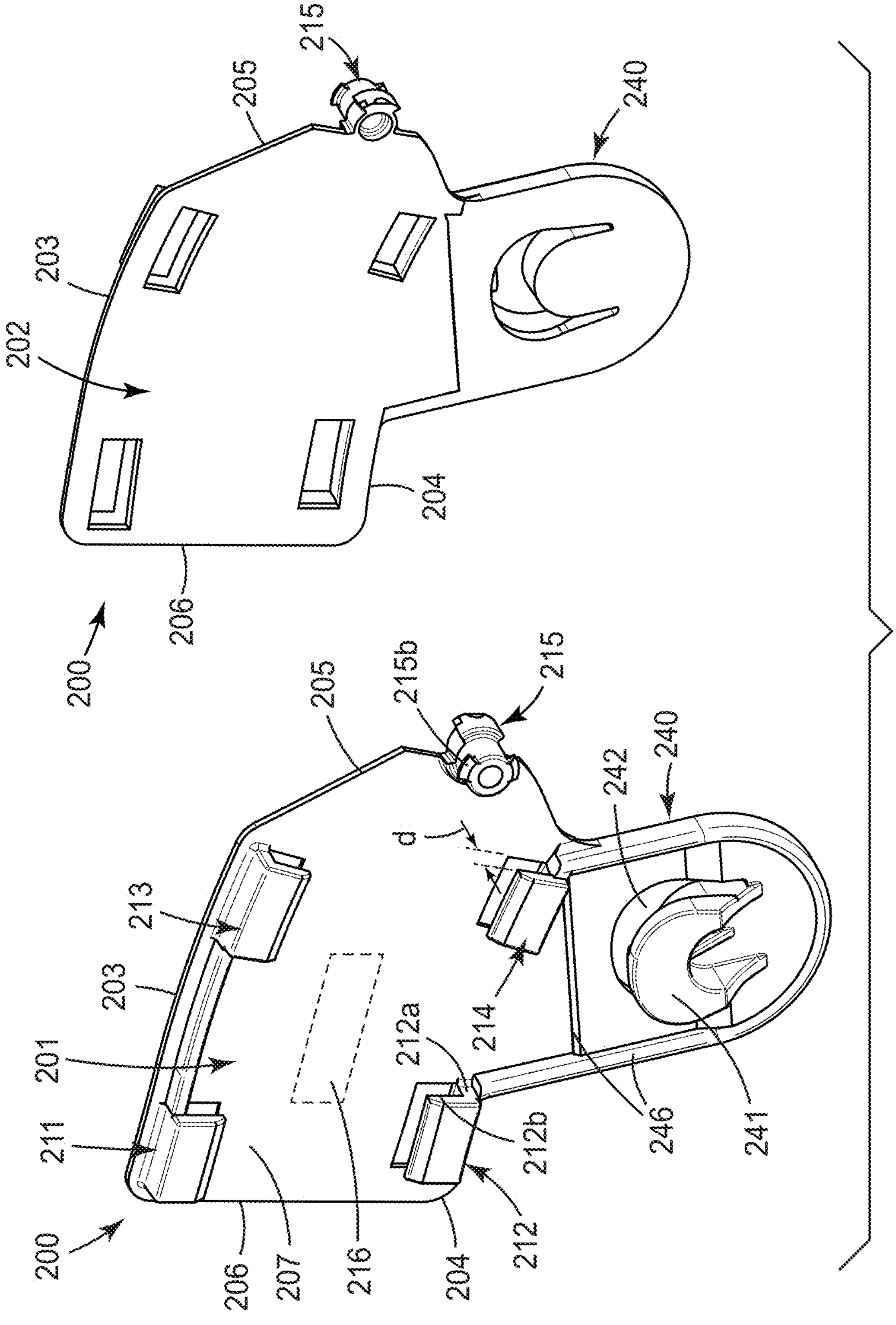
FIG. 2 is a perspective view of first and second exemplary harness adapters according to the present description.

Referring to FIG. 1, an exemplary embodiment of a personal protective assembly 10 includes headwear 20, respiratory protection device 30, and harness adapter 100. Respiratory protection device 30 includes a mask body 40 and a harness assembly 50. Harness adapter 100 is secured to a component of headwear 20, such as suspension 21, to provide a stable attachment point for a component of harness assembly 50.

Mask body 40 may include a rigid or semi-rigid portion **40*a* and a face contacting portion 40*b*. Face contacting portion 40*b* may be formed of a soft or compliant material that provides a comfortable fit and is able to seal against the face of a wearer to prevent ingress of external air. In various exemplary embodiments, mask body 40** may provide a half-mask that covers the nose and/or mouth of a wearer, or a full-mask that covers a wearer's eyes and/or other parts of the wearer's head.

Harness assembly 50 includes one or more straps to secure mask body 40 in position over a wearer's nose and mouth. In some exemplary embodiments, harness assembly 50 includes upper straps 51 and lower straps 52. Upper and lower straps 51, 52 may be portions of a single continuous strap passing through one or more loops or attachment elements of mask body 40, for example, or may be discrete, individual straps that are each attached to mask body 20. Upper and lower straps 51, 52 may be appropriately tensioned such that face contacting portion 40*b* of mask body 40 is adequately positioned and/or sealed against a wearer's face and in some embodiments may comprise an elastic or semi-elastic material.

In an exemplary embodiment, harness assembly 50 includes a first upper strap 51*a* extending from mask body 40 in front of and/or over a wearer's ear. The first upper strap 51*a* is attached to a first harness adapter 100 supported by suspension 21. A second upper strap (not shown in FIG. 1) extends from mask body 40 in front of and/or over a wearer's opposite ear and similarly attached to a second harness adapter (not shown in FIG. 1) supported on the opposite side of suspension 21. First upper strap 51*a* and second upper strap include first and second strap attachment elements 53*a* that may be releasably attached to harness adapters 100.

In some embodiments, harness assembly 50 includes a first lower strap 52*a* having a first strap attachment element 54*a* and a second lower strap 52*b* having a second strap attachment element 54*b*. First and second strap attachment elements 54*a*, 54*b* may be attached to one another to secure lower straps 52*a*, 52*b* around a user's neck. Alternatively or in addition, personal protective assembly 10 may be configured so that first and second strap attachment elements 54*a*, 54*b* may be attached at one or more locations of head suspension 21. For example, one or more additional harness adapters may be supported by a rear strap 23 of suspension 21, and first and second strap attachment elements 54*a*, 54*b* may be attached to the harness adapters. In some exemplary embodiments, first and second lower straps are thus positionable between at least a first configuration (shown in solid) in which first strap attachment element 54*a* is attached only to the second strap attachment element 54*b*, and a second configuration (shown in phantom) in which first and second strap attachment elements are attached to one or more harness adapters 100. Such a configuration allows a wearer to select the positioning of lower straps based on personal preference and/or clothing or other personal protective equipment that may be worn with personal protective assembly 10.

Harness attachment element 140 includes one or more attachment features complementary to one or more attachment features of strap attachment element 53*a*. In various exemplary embodiments, harness attachment element 140 includes a hook and strap attachment element 53*a* includes a loop. The hook may be an upwardly opening hook that the loop can be readily positioned on. The hook and loop are readily connectable without requiring fine manipulation or visual alignment of the components, and can be readily joined even while wearing gloves or other personal protective equipment. In other exemplary embodiments, harness attachment element 140 may include a loop or other receptacle that a hook or complementary shaped component of strap attachment element 53*a* can be attached to. Alternatively or in addition, harness attachment element 140 and strap attachment element 53*a* may include one or more of a receptacle, snap-fit, press-fit, key and slot, hook and loop (such as hook and loop fastener available from 3M Co.), that allow a secure and releasable attachment with one another.

Harness adapter 100 may be configured for secure and/or releasable attachment with one or more portions of head suspension 21. In an exemplary embodiment, head suspension 21 includes a front strap portion 22, rear strap portion 23, and lateral strap portions 24 extending at least partially between front and rear strap portions 22, 23. When head suspension 21 is positioned for use, the lateral strap portions 24 may be substantially horizontal over at least a portion of their length. In some exemplary embodiments, harness adapter is attachable to the lateral strap portions 24 slightly in front of, and/or above, the wearer's ear.

Rear strap portion 23 extends at least partially around a rear of the wearer's head between respective lateral strap portions 24. In some exemplary embodiments, rear strap portion 23 extends at least partially downwards such that at least a portion of rear strap portion 23 is below lateral strap portions 24. In some exemplary embodiments, harness adapter 100 is attachable to the rear strap portion 23 slightly behind, and/or below, the wearer's ear.

Upper straps 51 that are independently attachable to one or more harness adapters 100 allow a wearer to easily don respiratory protection device 30 by joining strap attachment element 53*a*, for example, to harness attachment element 140. Similarly, a user may quickly doff respiratory protection device 30 by releasing strap attachment element 53*a* from harness adapter 100. In some exemplary embodiments, first and second lower straps 52*a*, 52*b* allow mask body 40 to be alternately secured in a position of use and a "drop down" position in which mask body 40 is away from the mouth of the wearer and hung loosely by lower straps 52*a*, 52*b*. Accordingly, a wearer may quickly alternate mask body 40 between a position of use over the mouth and/or nose, and a "drop down" configuration, without the need to remove headwear 20 or adjust head suspension 21.

Referring to FIGS. 2-5, an exemplary harness adapter 200 is shown. Harness adapter 200 includes first and second major surfaces 201, 202, one or more protrusions 211-214, such as suspension attachment protrusions, and a harness attachment element 240. First major surface 201 and/or one or more protrusions 211-114 define one or more suspension receiving areas 207 where a headwear strap suspension, such as suspension 21 (FIG. 1), may be positioned, as described in greater detail herein.

In an exemplary embodiment, first and second major surfaces 201, 202 at least partially extend between upper and lower edge regions 203, 204, and front and rear edge regions 205, 206 of harness adapter 200. Harness attachment element 240 may be positioned proximate lower edge region 204, and may extend downwardly from lower edge region 204 below suspension receiving area 207, for example. Accordingly, when harness adapter 200 is attached to a head suspension, first major surface 201 may be positioned proximate a head suspension strap while harness attachment element 240 extends downwardly below the head suspension strap.

Figure 3:
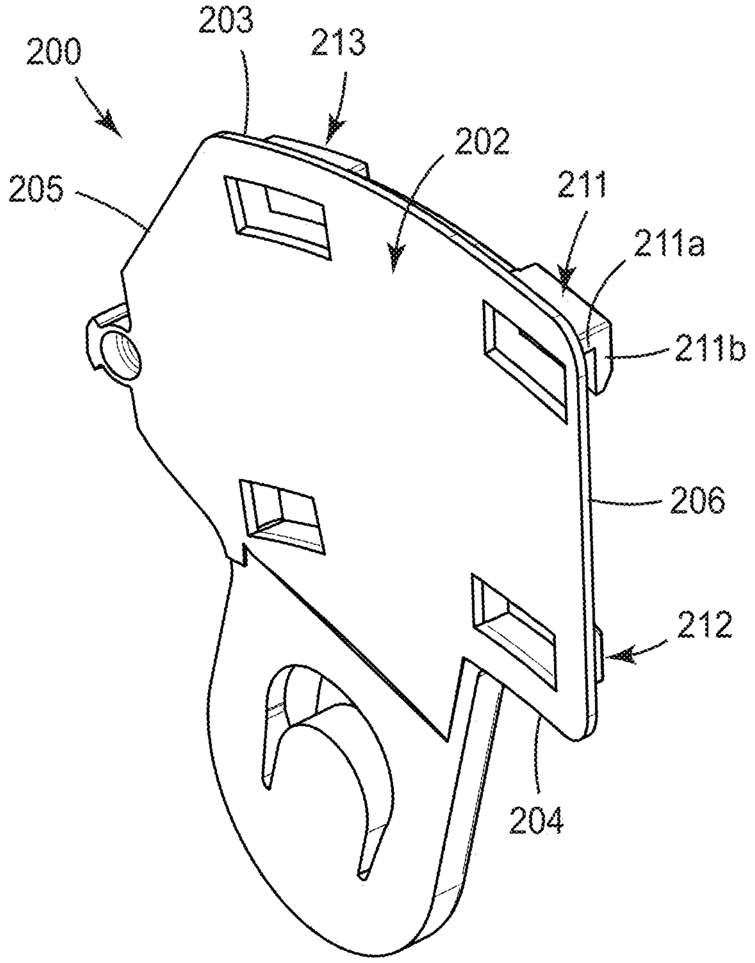
FIG. 3 is a rear perspective view of an exemplary harness adapter according to the present description.
Figure 4:
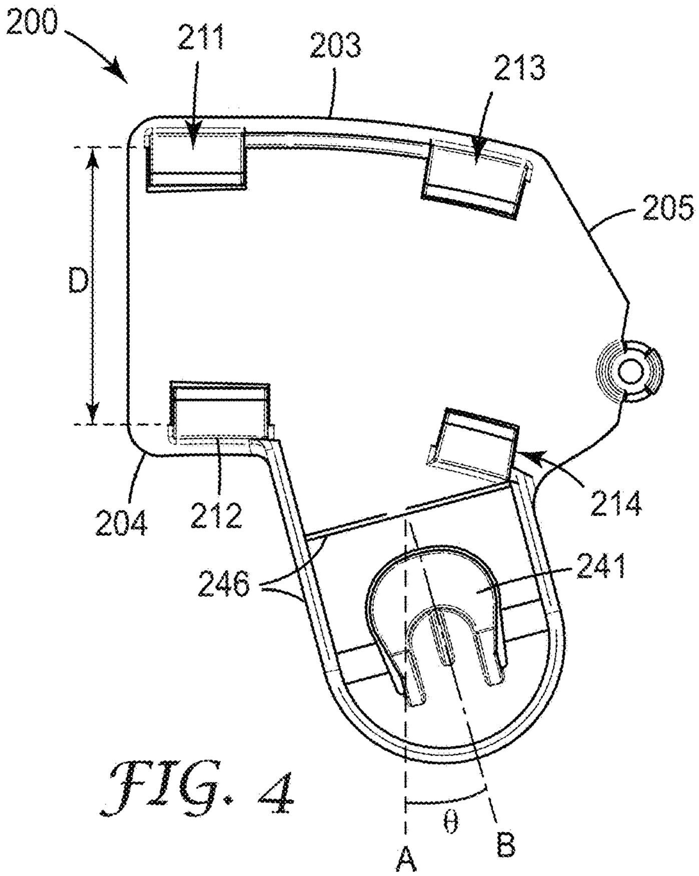
FIG. 4 is a front view of an exemplary harness adapter according to the present description.
Figure 5:
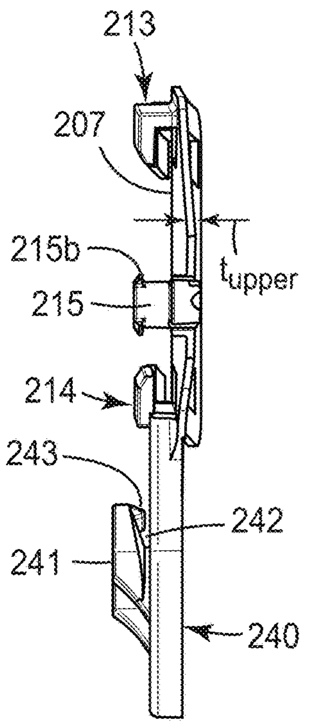
FIG. 5 is a side view of an exemplary harness adapter according to the present description.

One or more protrusions 211 facilitate secure attachment of harness adapter 200 to the suspension strap. In an exemplary embodiment, first protrusion 211 is positioned proximate upper edge region 203, for example extending from first major surface 201. First protrusion 211 includes a shape complementary to the suspension strap, and in various exemplary embodiments includes a tab, arm, extension, or the like, that extends around and/or through the suspension strap. In an exemplary embodiment, first protrusion 211 includes an outwardly extending portion or post 211*a* and an overhanging or flange portion 211*b* (FIG. 3). Flange portion 211*b* defines a space in which a portion of the suspension strap may be received. First protrusion 211 may thus be positioned and/or snapped around an upper edge of the suspension strap, for example. In some exemplary embodiments, first protrusion 211 is sized so that the suspension strap may be frictionally retained between flange portion 211*b* and first major surface 201 in an interference fit engagement.

In some exemplary embodiments, a second protrusion 212 is positioned proximate lower edge region 204, for example extending outwardly from first major surface 201. Second protrusion 212 may have a shape similar to first protrusion 211 including an outwardly extending portion 212*a* and an overhanging or flange portion 212*b*. Flange portion 212*b* defines a space in which a portion of the suspension strap may be received such that second protrusion 212 may be positioned and/or snapped at lower edge of the suspension strap, for example. In some exemplary embodiments, second protrusion 212 is sized so that the strap may be frictionally retained between flange portion 212*b* and first major surface 201 in an interference fit engagement.

First and second strap attachment protrusions 211, 212 are sized and spaced to define a channel to accommodate a head suspension strap. In an exemplary embodiment, inner surfaces of first and second protrusions 211, 212 are spaced a distance (D) (FIG. 4) to accommodate a head suspension strap. In various exemplary embodiments, distance (D) is between 8.0 cm and 1.5 cm, 6.0 cm and 2.0 cm, or about 2.5 cm. Further, a head suspension strap may have a height (h) (FIG. 6) between upper and lower edges, and distance (D) may be between 150% and 80%, 120% and 90%, and about 105% of height (h).

First and second protrusions 211, 212 may also be sized to accommodate a suspension strap having a particular thickness. In an exemplary embodiment, flange portion 212*b* is spaced a distance (d) (FIG. 2) from first major surface 201 to define a space between first major surface 201 to accommodate a portion of the strap having a thickness (t) ((t) not shown in drawings). In various exemplary embodiments, distance (d) is between 10 mm and 0.2 mm, 5 mm and 1 mm, or about 2 mm, and in some embodiments may be elastically deformable to accommodate a strap having a thickness (t) greater than distance (d).

Harness adapter 200 may include additional protrusions to facilitate secure attachment with the suspension strap. In an exemplary embodiment, harness adapter 200 includes third and fourth protrusions 213, 214 proximate upper and lower edge regions 203, 204, respectively. Third and fourth protrusions 213, 214 are spaced from first and second protrusions 211, 212, and may have a similar shape and configuration to be secured around upper and lower edges of the suspension strap.

In an exemplary embodiment, harness adapter 200 may be slightly curved to accommodate a curved strap of a head suspension. For example, first major surface 201 may provide a slightly convex surface and second major surface 202 may provide a slightly concave surface. The curvature of harness adapter 200 may be similar to a curvature of the suspension strap, so that the shape of harness adapter 200 is compatible with the suspension strap. In some embodiments, the curvature of harness adapter 200 may be slightly greater than or less than a curvature of the suspension strap. For example, harness adapter 200 must be slightly bent or deformed when attached to the head suspension strap, and the tension or restorative forces may act to additionally secure harness adapter 200 in position on the suspension strap. In such embodiments, harness adapter 200 may be relatively thinner and/or more flexible than the suspension strap so that the restorative forces of harness adapter 200 do not deform the suspension strap.

Harness adapter 200 includes one or more features configured to prevent forward or rearward movement along the suspension strap when supporting a respiratory protection device, for example. In an exemplary embodiment, harness adapter 200 includes a lateral stability element configured to contact the head suspension strap and prevent relative motion between the suspension strap and harness adapter 200 along a longitudinal axis of the strap. In the exemplary embodiment shown in FIGS. 2-5, harness adapter 200 includes a post 215 proximate front region 205 that may be pressed through a complementary sized opening in the suspension strap. For example, the head suspension strap may include an opening slightly smaller than a portion of post 215. Post 215 may be pressed or snapped through the opening and retained in position by a flanged end 215*b* of post 215. Relative lateral movement is prevented by interference between post 215 and the suspension strap. Alternatively or in addition, lateral stability element may include an adhesive 216, and/or one or more additional press-fit, snap-fit, or hook-and-loop fasteners, or the like, for example.

Second major surface 202 is configured to face inwardly towards a wearer's head when attached to a head suspension strap. In an exemplary embodiment, second major face 202 is free of projections extending away from the second major surface and towards a wearer's head. For example, second major surface 202 may be substantially smooth, without sharp corners or features that could be perceived as causing discomfort to a user.

Harness adapter has an upper thickness ($t_{upper}$) between first and second major surfaces 201, 202. In an exemplary embodiment, upper thickness ($t_{uppper}$) may be between 0.25 mm and 4 mm, 0.5 mm and 2 mm, or about 1 mm. Such dimensional ranges provide several advantages. Harness adapter 200 has sufficient thickness such that harness adapter 200 resists inadvertent bending that could cause harness adapter 200 to release from a head suspension strap. That is, harness adapter 200 may have an upper thickness ($t_{upper}$) that allows the harness adapter 200 to be slightly flexed by a user when securing to a head suspension strap, and that provides sufficient stiffness so that harness adapter stays in position on the head suspension strap. Such ranges also provide a harness adapter 200 that is sufficiently thin to reduce bulky portions that could be perceived to cause discomfort to a user, and that does not significantly extend inwardly towards the head of a wear from an interior side of the head suspension strap.

Harness adapter 200 includes a harness attachment element 240 configured to releasably attach a strap component of a respiratory harness assembly. In an exemplary embodiment, harness attachment element 240 extends below lower edge region 204, such that harness attachment element 240 is positioned below head suspension strap during use. Harness attachment element 240 includes one or more features attachable to a strap attachment element of a harness assembly, such as harness assembly 50 (FIG. 1). In the exemplary embodiment shown in FIGS. 2-5, harness attachment element 240 includes a hook 241 defining a channel 242. Hook 241 opens upwardly such that a complementary feature of a strap attachment element, such as a loop, may be positioned around hook 241 and into channel 242. In various exemplary embodiments, harness attachment element 240 may include a loop, tab, flanged projection, or receptacle, for example, complementary to a strap attachment element.

Harness attachment element 240 may include one or more features to facilitate secure attachment with a strap attachment element to reduce inadvertent separation. For example, harness attachment element 240 includes a flange 243 extending at least partially across channel 242. Flange 243 provides a narrowed opening that a loop or other feature of a strap attachment element must pass through to be secured in channel 242. In some exemplary embodiments, an opening of channel 242 proximate flange 243 is slightly narrower than a width of the loop or other complementary feature of a strap attachment element such that the feature must be snapped into and out of channel 242. Accordingly, harness attachment element 240 provides a secure attachment with a strap attachment element, and a snap effect may provide feedback to a user that the strap attachment element is engaged with harness attachment element 240.

In an exemplary embodiment, hook 241 allows relative movement, such as relative rotation, between harness attachment element 240 and the strap attachment element. For example, a loop of a strap attachment element may be rotatable in channel 242 while securely attached to harness attachment element 240. Harness adapter 200 thus allows at least one degree of relative movement to accommodate a desired configuration of harness assembly 50. Such a degree of relative movement further reduces forces that could create undue stress on a wearer, or that could allow the harness adapter 200 to be separated from a head suspension strap.

In some exemplary embodiments, harness attachment element 240 is angled relative to other portions of harness adapter 200. For example, protrusions 211 and 212 define a substantially horizontal channel configured to receive a substantially horizontal strap. Harness attachment element 240 is non-perpendicular with the strap channel, and may be angled forwardly relative to an axis (A) substantially perpendicular to the channel and/or substantially parallel to gravity such that axes (A) and (B) are not parallel. In various exemplary embodiments, a longitudinal axis (B) passing centrally through harness attachment element 240 forms an angle (θ) with axis (A) between 60° and 5°, 45° and 15°, or about 30°. A harness attachment element 240 angled relative to a vertical axis may be in relative alignment with a force applied by a strap of harness assembly 50. Accordingly, a torque or rotational force that could otherwise be applied to harness adapter 200 by harness assembly 50 is reduced, and the security of harness adapter 200 on a suspension strap may be increased.

In some exemplary embodiments, harness attachment element 240 may be relatively more rigid than other portions of harness adapter 200, such as between upper and lower edge regions 203, 204. For example, harness attachment element 240 may include one or more ribs 246 or thickened regions that increase the stiffness and rigidity of harness attachment element 240. Accordingly, first and second major surfaces 201, 202 may be flexed or bent relatively more easily as compared to harness attachment element 240. A relatively stiffer harness attachment element 240 facilitates a secure connection with strap attachment elements of harness assembly 50.

Referring again to FIG. 2, harness adapter 200 may be provided in one or more pairs of first and second harness adapters 200. In an exemplary embodiment, second harness adapter 200 is a mirror image of first harness adapter 200, configured for attachment to a suspension strap opposite first harness adapter 200. In this way, first and second harness adapters 200 are non-symmetrical, and each may be configured for attachment on a left or right side of a suspension strap.

Harness adapters 200 may be formed of a material having suitable properties for elastic deformation over a range of normal bending and flexing while exhibiting the ability to securely attach to a suspension strap, for example. In an exemplary embodiment, harness adapter 200 is integrally formed as a unitary component from polypropylene, such as a material having the trade name P5M4K-046 available from Flint Hills Resources of Wichita, Kans. Other suitable materials include polyethylene, acrylonitrile butadiene styrene (ABS), plastics, metals, and/or spring steel, for example.

Figure 6:
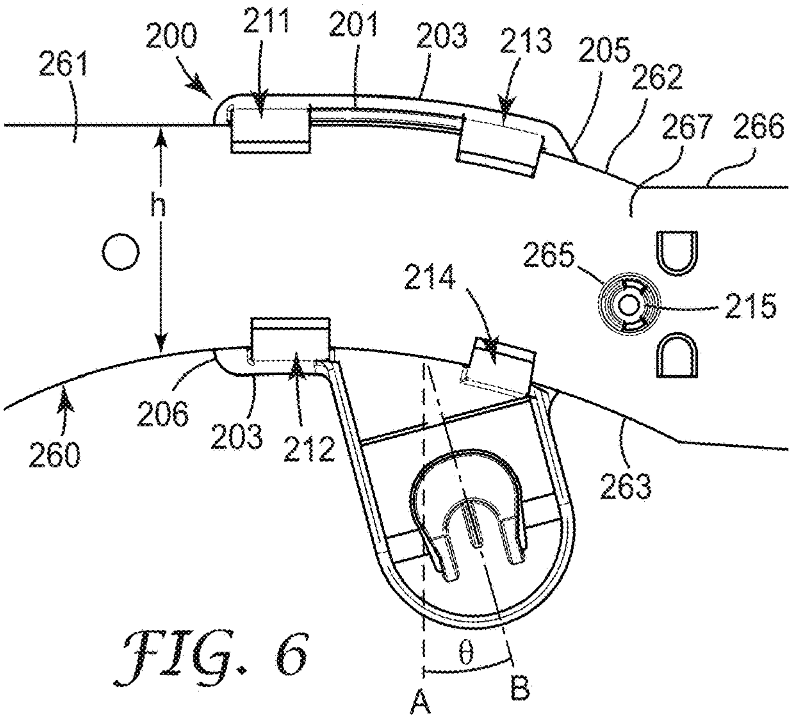
FIG. 6 shows an exemplary harness adapter attached to a strap of a head suspension.
Figure 7:
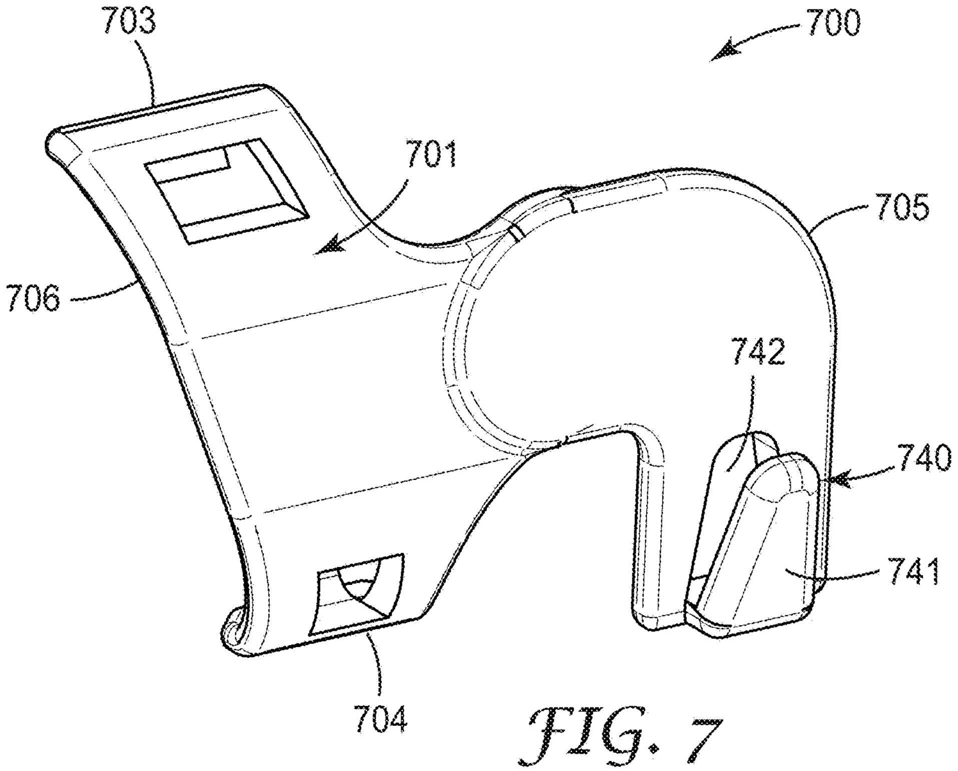
FIG. 7 shows a front perspective view of an exemplary harness adapter according to the present description.
Figure 8:
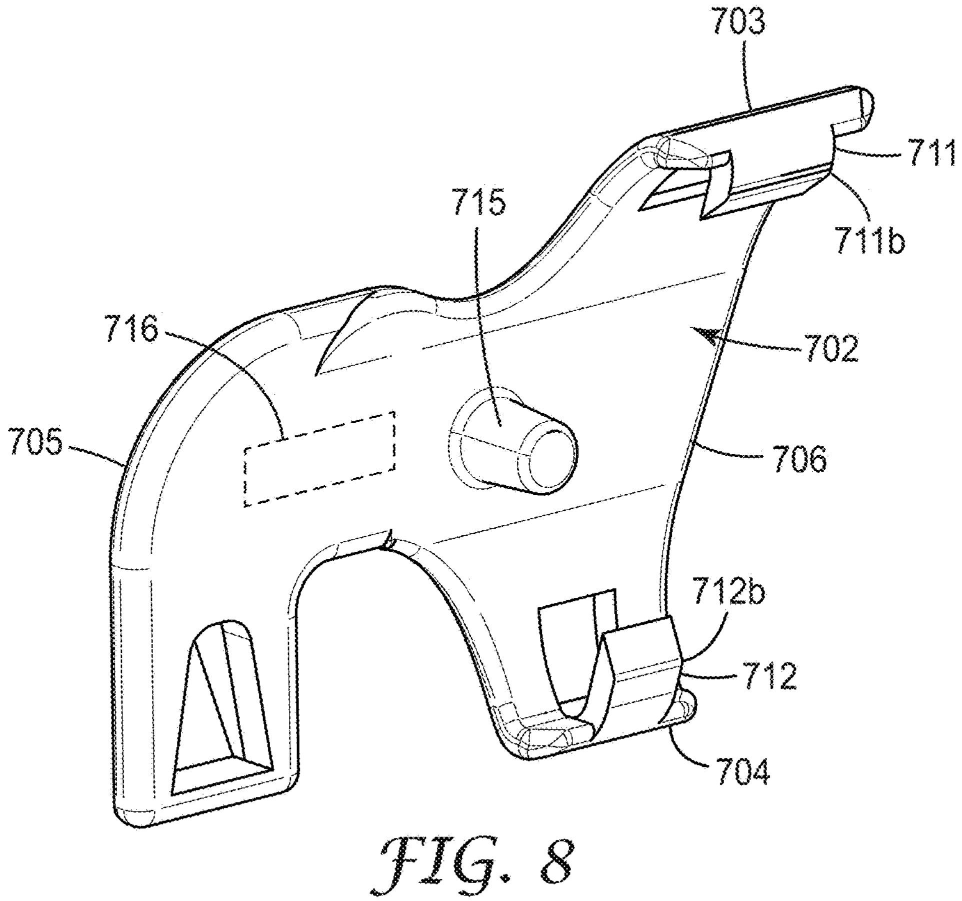
FIG. 8 shows a rear perspective view of an exemplary harness adapter according to the present description.
Figure 9:
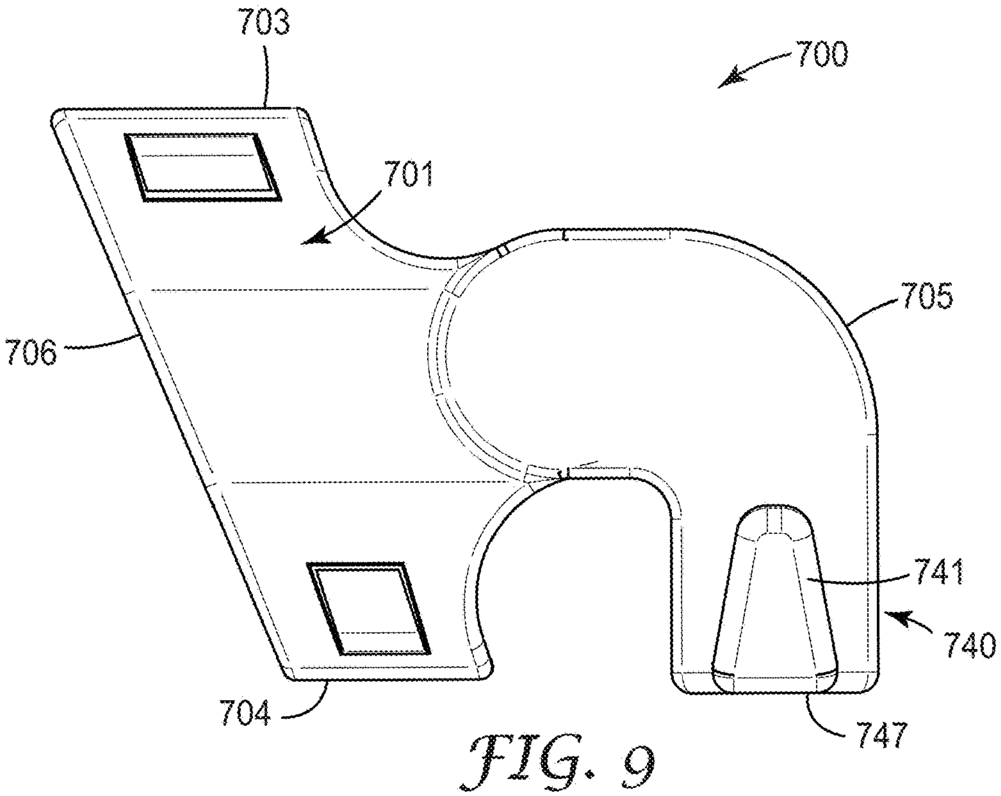
FIG. 9 shows a front view of an exemplary harness adapter according to the present description.
Figure 10:
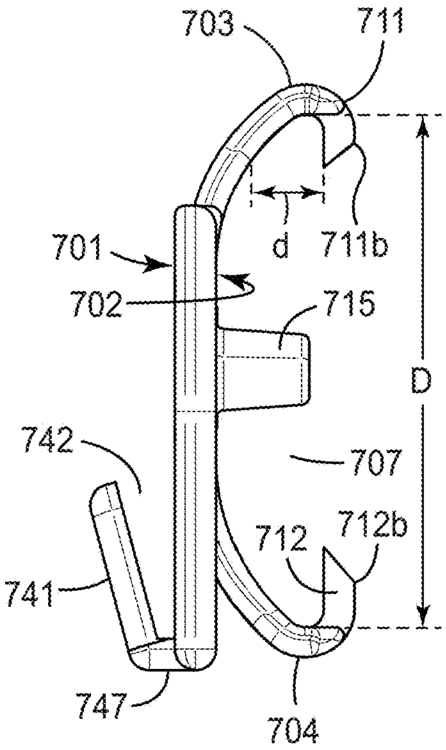
FIG. 10 shows a side view of an exemplary harness adapter according to the present description.

Referring to FIG. 6, an exemplary harness adapter 200 is shown attached to suspension strap 261 of a head suspension 260. Harness adapter 200 is secured to suspension strap 261 by flexing slightly so that protrusions 211, 212, 213, 214 are positioned around suspension strap 261, and suspension strap 261 is positioned within the channel defined by harness adapter 200. First and third protrusions 211, 213 are positioned around an upper edge 262 of suspension strap 261 and second and fourth protrusions 212, 214 are positioned around a lower edge 263 of suspension strap 261. One or more of protrusions 211, 212, 213, 214 are angled and offset from one another to accommodate non-straight upper and lower edges 262, 263 of suspension strap 261. Post 215 of harness adapter 200 is positioned through an opening 265 of suspension strap 261 to prevent relative lateral movement between suspension strap 261 and harness adapter 200. In an exemplary embodiment, harness attachment element 240 extends below lower edge 263 and is accessible by a user to secure a strap attachment element.

Harness adapter 200 attached to suspension strap 261 such that first major surface 201 of harness adapter 200 faces toward, and is in at least partial contact with, interior surface 266. Protrusions extend around upper and lower edges 262, 263 of suspension strap 261, in a direction away from interior surface 266, and contact exterior surface 267 of suspension strap 261. Harness adapter 200 thus contacts both interior and exterior surfaces of suspension strap 261, and protrusions 211, 212, 213, 214 extend outwardly away from a head of a wearer.

Harness adapter 200 is attached to suspension strap 261 without modification or adaptation to suspension strap 261. Accordingly, harness adapter 200 may be attached to an existing headwear 20, for example, to increase the functionality and compatibility with a respiratory protection device. The harness adapter 200 may be quickly secured without the need for tools or additional components.

Referring to FIGS. 7-10, an exemplary embodiment of a harness adapter 700 is shown. Harness adapter 700 includes first and second major surfaces 701, 702, one or more protrusions 711, such as suspension attachment protrusions 711, and a harness attachment element 740. Second major surface 702 and/or one or more protrusions 711 define one or more suspension receiving areas 707 where a headwear suspension strap, such as a hardhat suspension strap, may be positioned, as described in greater detail herein.

In an exemplary embodiment, first and second major surfaces 701, 702 at least partially extend between upper and lower edge regions 703, 704, and front and rear edge regions 705, 706. In the embodiment shown in FIG. 7, a lower portion 747 of harness attachment element 740 is positioned substantially even with suspension receiving area 707. In other exemplary embodiments, harness attachment element 740 may extend downwardly below lower edge region 704, below suspension receiving area 707, for example. Accordingly, when harness adapter 700 is attached to a head suspension, second major surface 702 may be positioned proximate a strap while harness attachment 740 is positioned adjacent to, or extending downwardly below, the strap.

One or more protrusions 711 facilitate a secure attachment of harness adapter 700 to a headwear suspension strap. In an exemplary embodiment, a first protrusion 711 is positioned proximate an upper edge region 703 of second major surface 702. First protrusion 711 includes a shape complementary to a head suspension strap, and in various exemplary embodiments includes a tab, arm, extension, or the like, that extends around and/or through a strap of a head suspension, such as head suspension 21 (FIG. 1). In an exemplary embodiment, first protrusion 711 extends from an edge of harness adapter 700 and curves back towards a central portion of harness adapter 700 to define a space in which a portion of a head suspension strap may be received. First protrusion 711 may thus be positioned and/or snapped around an upper edge of the strap, for example. In some exemplary embodiments, first protrusion 711 is sized so that the strap may be frictionally retained between a portion of first protrusion 711 and the second major surface 702 in an interference fit engagement.

In some exemplary embodiments, a second protrusion 712 extends from an edge of harness adapter 700 proximate the lower edge region 704 and curves back towards a central portion of harness adapter 700 to similarly define a space in which a portion of a head suspension strap may be received. Second protrusion 712 may thus also be positioned and/or snapped around a lower edge of the strap, for example. In some exemplary embodiments, second protrusion 712 is sized so that the strap may be frictionally retained between a portion of second protrusion 712 and the second major surface 702 in an interference fit engagement.

First and second strap attachment protrusions 711, 712 are sized and spaced to define a channel to accommodate a head suspension strap. In an exemplary embodiment, first and second protrusions 711, 712, in combination with second major surface 702, for example, are spaced a distance (D) to accommodate a head suspension strap. In various exemplary embodiments, distance (D) is between 8.0 cm and 1.5 cm, 6.0 cm and cm, or about 2.5 cm. Further, a head suspension strap may have a height (h) (FIG. 11) between upper and lower edges, and distance (D) may between 150% and 80%, 120% and 90%, and about 105% of height (h).

First and second protrusions 711, 712 may also be sized to accommodate a strap having a particular thickness. In an exemplary embodiment, protrusions 711, 712 are spaces between second major surface 702 a distance (d) (FIG. 2) to accommodate a portion of the strap having a thickness (t). In various exemplary embodiments, distance (d) is between 10 mm and 0.5 mm, 5 mm and 1 mm, or about 2 mm, and in some embodiments first and second protrusions 711, 712 may be elastically deformable to accommodate a strap having a thickness (t) greater than distance (d).

Harness adapter 700 may include additional protrusions to facilitate secure attachment with a head suspension strap. In an exemplary embodiment, harness adapter 700 further includes third and fourth protrusions configured to curve around an upper edge of a head suspension strap, and may be spaced from first and second protrusions 711, 712.

First and second major surfaces 701, 702 may be curved about a longitudinal axis extending between front and rear edge portions 705, 706 and configured to be substantially parallel with a longitudinal axis of a head suspension strap. For example, first major surface may be convex and second major surface may be concave. Such curvature facilitates positioning of first and second protrusions 711, 712 around upper and lower edges of a head suspension strap.

Harness adapter 700 includes one or more features configured to prevent forward or rearward movement along a head suspension strap, for example when supporting a respiratory protection device. In an exemplary embodiment, harness adapter 700 includes a lateral stability element configured to contact the head suspension strap and prevent relative motion between the head suspension and the harness adapter 700 along a longitudinal axis of the strap. In the exemplary embodiment shown in FIGS. 7-10, harness adapter 700 includes a post 715 that may be pressed through a complementary sized opening in the head suspension strap. For example, the head suspension strap may include an opening slightly smaller than a portion of post 715. Post 715 may be pressed or snapped through the opening and retained in position. Relative lateral movement is prevented by interference between post 715 and the head suspension strap. Alternatively or in addition, lateral stability element may include an adhesive 716, and/or one or more additional press-fit, snap-fit, or hook-and-loop fasteners, or the like, for example.

In use, second major surface is configured to face inwardly towards a wearer's head while adjacent to an outer surface of the head suspension strap, while first and second projections 711, 712, extend around upper and lower edges of the head suspension strap to contact the inner side of the strap. Inner edges **711*b*, 712*b*** of the first and second protrusions are rounded and or substantially smooth to avoid edges that could result in location of focused pressure on a wearer's head or otherwise perceived as causing discomfort.

First and second major surfaces 701, 702 are separated by a thickness to provide sufficient rigidity that harness adapter 700 may be securely attached to the head suspension strap. In an exemplary embodiment, the thickness may be between 0.25 mm and 6 mm, 0.5 mm and 4 mm, or about 2 mm. Such dimensional ranges provide several advantages allow harness adapter 700 to resist inadvertent bending that could cause harness adapter 700 to release from a head suspension strap. Such ranges also provide a harness adapter 700 that reduces bulky portions that could be perceived to cause discomfort to a user, while allowing elastic deformation that facilitates attachment to the head suspension strap.

Harness adapter 700 includes a harness attachment element 740 configured to releasably attach a strap component of a respiratory harness assembly. Harness attachment element includes one or more features attachable to a strap attachment element of a harness assembly, such as harness assembly 50 (FIG. 1). Similar to harness attachment element 240, harness attachment element 740 includes a hook 741 defining a channel 742. Hook 741 opens upwardly such that a complementary feature of a strap attachment element, such as a loop, may be positioned around hook 741 and into channel 742. In various exemplary embodiments, harness attachment element 740 may include a loop, tab, flanged projection, or receptacle, for example, complementary to a strap attachment element. In some exemplary embodiments, an opening of channel 742 may slightly narrower than a width of the loop or other complementary feature of strap attachment element such that the feature must be snapped into and out of channel 742. Accordingly, harness attachment element 740 provides a secure attachment with a strap attachment element, and a snap effect may provide feedback to a user that the strap attachment element is engaged with harness attachment element 740 and secured for use.

In an exemplary embodiment, hook 741 allows relative movement, such as relative rotation, between harness attachment element 740 and the strap attachment element. For example, a loop of a strap attachment element may be able to rotate in channel 742 while securely attached to harness attachment element 740. Harness adapter 700 thus allows at least one degree of relative movement to accommodate a desired configuration of harness assembly 50. Such a degree of relative movement further reduces forces that could create undue stress on a wearer, or that could allow the harness adapter 700 to be separated from a head suspension strap.

Similar to harness adapters 200, harness adapter 700 may be provided in one or more pairs. In an exemplary embodiment, a second harness adapter is a mirror image of first harness adapter 700, configured for attachment to a head suspension strap opposite first harness adapter 700. In this way, first and second harness adapters are non-symmetrical, and each may be configured for attachment on a left or right side of a suspension strap.

Figure 11:
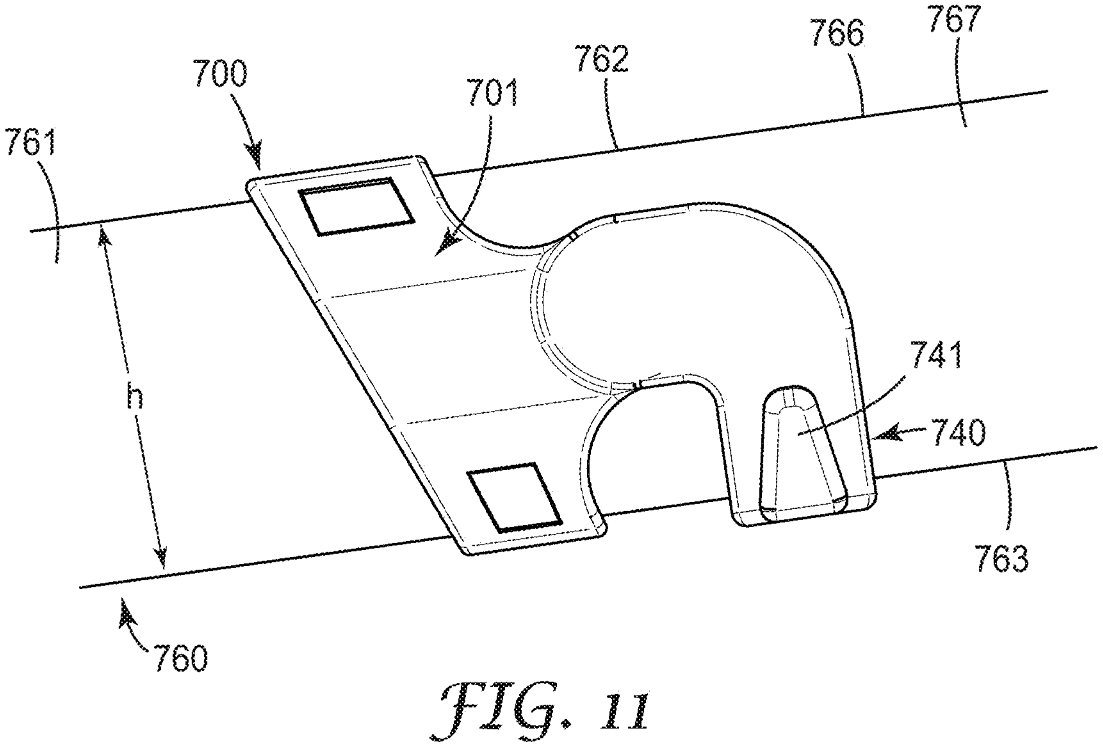
FIG. 11 shows an exemplary harness adapter attached to a strap of a head suspension.

Referring to FIG. 11, harness adapter 700 is shown attached to suspension strap 761 of a head suspension 760. Harness adapter 700 is secured to suspension strap 761 by positioning first and second protrusions around suspension strap 761, and/or flexing slightly, so that protrusions 711, 712 (FIG. 10) are positioned around suspension strap 761, and suspension strap 761 is positioned within the channel defined by harness adapter 700. In an exemplary embodiment, harness attachment element 740 includes upward opening hook 741 positioned above lower edge 263 and is accessible by a user to secure a strap attachment element.

Harness adapter 700 is attached to suspension strap 761 such that first major surface 701 faces outward. Second major surface 702 faces toward, and is in at least partial contact with, exterior surface 767 of suspension strap 761. Protrusions 711, 712 extend around upper and lower edges 762, 763 of suspension strap 761, in an inward direction towards interior surface 766, and contact interior surface 766. Harness adapter 700 is thus positioned substantially on the exterior of suspension strap 761 and contacts both interior and exterior surfaces of suspension strap 761.

Figure 12:
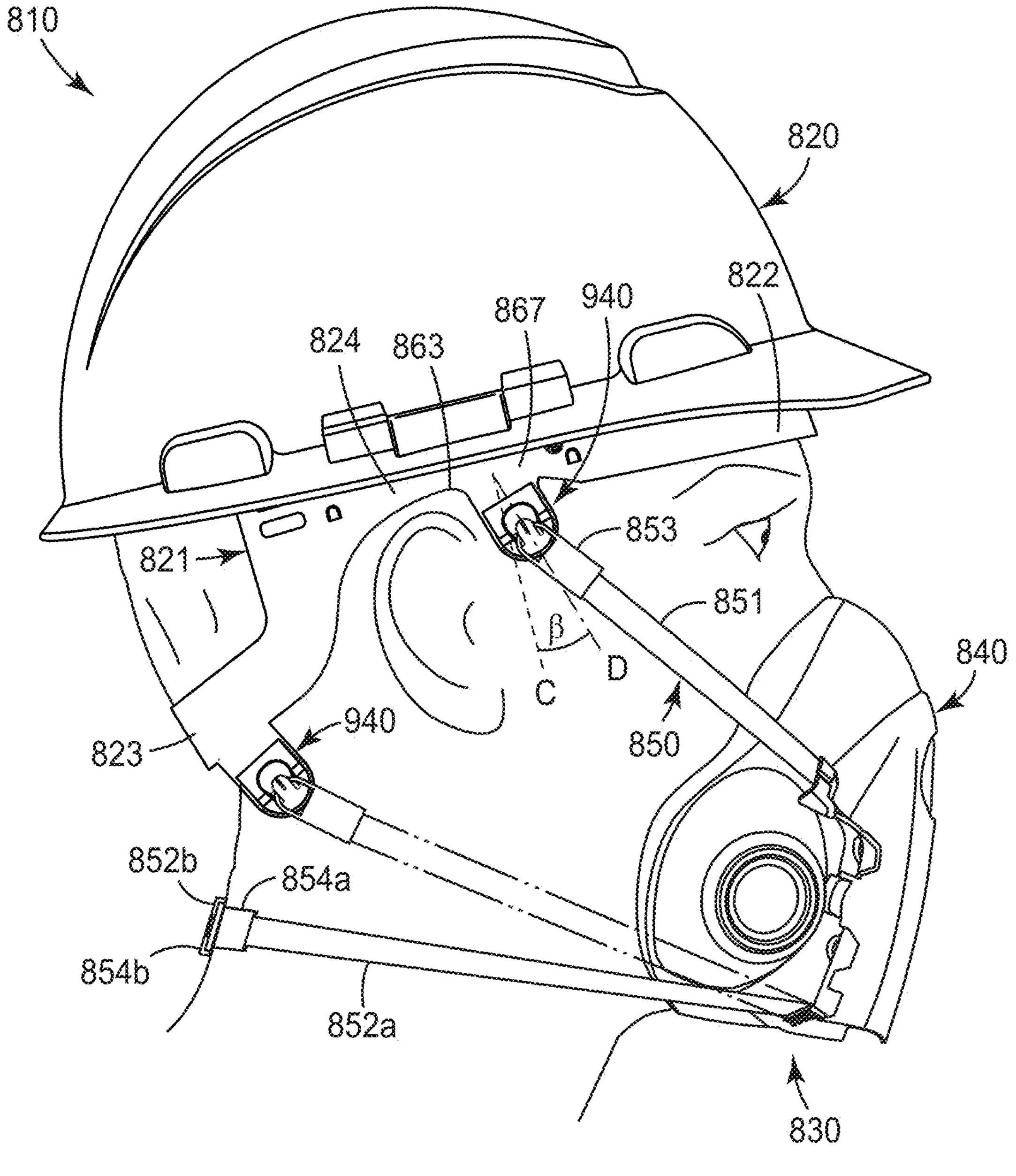
FIG. 12 shows an exemplary harness assembly according to the present description in a first configuration and a second configuration.

FIG. 12 shows an exemplary embodiment of a personal protective assembly 810 including headwear 820 and respiratory protection device 830. Respiratory protection device 830 includes a mask body 840 and a harness assembly 850. Headwear 820 includes a suspension 821 that at least partially supports headwear 820 on a wearer's head, and includes one or more attachment locations for a component of harness assembly 850.

In an exemplary embodiment, head suspension 821 includes a front strap portion 822, rear strap portion 823, and lateral strap portions 824 extending at least partially between front and rear strap portions 822, 283. When head suspension 821 is positioned for use, the lateral strap portions 824 may be substantially horizontal over at least a portion of their length.

Head suspension 821 includes one or more harness attachment elements 940 integral with a portion of head suspension 821. In an exemplary embodiment, first and second harness attachment elements 940 are positioned on respective lateral strap portions 824 on each side of a wearer's head and configured to releasably attach to strap attachment elements 853 of harness assembly 850. Harness adapter 940 may be positioned along lateral strap portions 824 slightly in front of, and/or above, the wearer's ear. In an exemplary embodiment, the first and second harness attachment elements 940 extend downwardly from a lower edge portion 863 of lateral strap portions 824. In various other exemplary embodiments, first and second harness attachment elements 940 may be positioned along an exterior surface 867 of lateral strap portions 824, or may extend at least partially upward above lateral strap portion, such that harness attachment elements 940 are positioned between an inner surface of headwear 820 and lateral strap 824, for example.

In an exemplary embodiment, harness attachment element 940 is angled relative to lateral strap portions 824. For example, lateral strap portions 824 may be substantially horizontal (e.g. perpendicular relative to gravity) when positioned for use on a wearer's head. Harness attachment elements 940 may be non-perpendicular with lateral strap portions 824 such that harness attachment elements 940 are angled forwardly. In some exemplary embodiments, harness attachment elements 940 form an angle with the lateral strap that is less than 90°. In use, an axis (C) passing centrally through harness attachment element 940 forms an angle (β) with an axis (D) substantially perpendicular to a longitudinal axis of lateral strap portions 824 and/or substantially parallel to gravity, such that axes (C) and (D) are not parallel. In various exemplary embodiments, angle (β) is between 60° and 5°, 45° and 15°, or about 30°. In an exemplary embodiment, harness attachment element 940 is in a fixed position relative to lateral strap portions 824. A harness attachment element 940 angled relative to a vertical axis may be in relative alignment with a force applied by a strap of harness assembly 850. Accordingly, a torque or rotational force that could otherwise be applied to head suspension 921 may be reduced.

Harness attachment element 940 includes one or more attachment features complementary to one or more attachment features of strap attachment elements 853. In various exemplary embodiments, harness attachment element 940 includes a hook and strap attachment element 853 includes a loop. The hook may be an upwardly opening hook that the loop can be readily positioned on. A hook and loop are readily connectable without requiring fine manipulation or visual alignment of the components, and can be readily joined even while wearing gloves or other personal protective equipment. In other exemplary embodiments, harness attachment element 940 may include a loop or receptacle that a hook or complementary shaped component of strap attachment element 853 can be attached to. Alternatively or in addition, harness attachment element 940 and strap attachment element 853 may include one or more of a receptacle, snap-fit, press-fit, key and slot, hook and loop (such as Hook and Loop fastener available from 3M Co.), that allow a secure and releasable attachment with one another.

In some embodiments, harness assembly 850 includes a first lower strap **852*a* having a first strap attachment element 854*a* and a second lower strap 852*b* having a second strap attachment element 854*b*. First and second strap attachment elements 854*a*, 854*b* may be attached to one another to secure lower straps 852*a*, 852*b* around a user's neck. Alternatively or in addition, personal protective assembly 800 may be configured so that first and second strap attachment elements 854*a*, 854*b* may be attached at one or more locations of suspension 821. For example, one or more additional harness attachment elements 940 may be integral with head suspension 821. In an exemplary embodiment, head suspension 821 includes third and fourth harness attachment elements 940 integral with rear strap 824, and first and second strap attachment elements 854*a*, 854*b* may be attached to third and fourth harness attachment elements 940. In some exemplary embodiments, first and second lower straps 852*a*, 852*b* are thus positionable between at least a first configuration (shown in solid) in which first strap attachment element 854*a* is attached only to the second strap attachment element 854*b*, and a second configuration (shown in phantom) in which first and second strap attachment elements are attached to one or more harness attachment elements 940 integral with rear strap 824. Such a configuration allows a wearer to select the positioning of lower straps based on personal preference and/or clothing or other personal protective equipment that may be worn with personal protective assembly 800**.

Similar to personal protective assembly 10 described above, upper straps 851 that are independently attachable to one or more harness attachment elements 940 integral with strap portions of suspension 821 allow a wearer to easily don respiratory protection device 820 by joining strap attachment element 853, for example, to harness attachment element 940. Similarly, a user may quickly doff respiratory protection device 820 by releasing strap attachment element 853 from harness attachment element 940. In some exemplary embodiments, first and second lower straps 852*a*, 852*b* allow mask body 840 to be alternately secured in a position of use and a "drop down" position in which mask body 840 is away from the mouth of the wearer and hung loosely by lower straps 852*a*, 852*b*. Accordingly, a wearer may quickly alternate mask body 840 between a position of use over the mouth and/or nose, and a "drop down" configuration, without the need to remove headwear 820 or adjust head suspension 821.

The foregoing detailed description and examples have been given for clarity of understanding only. No unnecessary limitations are to be understood there from. It will be apparent to those skilled in the art that many changes can be made in the embodiments described without departing from the scope of the disclosure. Any feature or characteristic described with respect to any of the above embodiments can be incorporated individually or in combination with any other feature or characteristic, and are presented in the above order and combinations for clarity only. Thus, the scope of the present disclosure should not be limited to the exact details and structures described herein. Moreover, although features may be described herein as acting in certain combinations and/or initially claimed as such, one or more features from a claimed combination can in some cases be excised from the combination, and the claimed combination may be directed to a subcombination or variation of a subcombination.

What is claimed is:

1. A respiratory protection device harness adapter, comprising:
- first and second major surfaces having an upper edge region and a lower edge region;
- a first suspension attachment protrusion proximate the upper edge region;
- a second suspension attachment protrusion proximate the lower edge region; and
- a harness attachment element comprising a hook and configured to releasably attach a strap component of a respiratory harness assembly;
- wherein the first and second suspension attachment protrusions are spaced and configured to releasably attach to a head suspension of a headwear article, the adapter further comprising a strap attachment element and wherein the strap attachment element further comprises a loop, and the hook is connectable with the loop.

2. The adapter of claim 1, wherein the harness attachment element extends downwardly from the lower edge region.

3. The adapter of claim 1, wherein the first and second suspension attachment protrusions extend outwardly from the first major surface.

4. The adapter of claim 1, wherein the first suspension attachment protrusion is configured to attach around an upper edge of the head suspension of the headwear article.

5. The adapter of claim 1, wherein the first and second suspension attachment protrusions are spaced to define a channel configured to receive the head suspension of the headwear article.

6. The adapter of claim 1, wherein the second major surface is configured to contact a wearer's head and is free of projections extending from the second major surface.

7. The adapter of claim 1, wherein the first and second major surfaces are separated by a thickness (t), and the thickness (t) is between 0.25 mm and 4 mm.

8. The adapter of claim 1, further comprising a lateral stability element configured to contact the head suspension of the headwear article and prevent relative motion between the head suspension and the adapter along a longitudinal axis of the head suspension.

9. The adapter of claim 8, wherein the lateral stability element comprises a post configured to extend through an opening in the head suspension.

10. The adapter of claim 8, wherein the lateral stability element comprises an adhesive.

11. The adapter of claim 1, wherein when the adapter is attached to the head suspension, the hook is angled relative to a vertical axis.

12. The adapter of claim 3, wherein the first major surface is configured to contact an inner surface of the head suspension.

13. A respiratory protection assembly, comprising:
- a hardhat comprising a hardhat suspension configured to support the hardhat on a wearer's head, the hardhat suspension comprising a lateral strap configured to extend at least partially along a side of a wearer's head;
- a respirator comprising a harness assembly, the harness assembly including first and second strap portions on opposite sides of the respirator; and
- first and second harness adapters, each comprising:
  - first and second major surfaces having an upper edge region and a lower edge region;
  - a first suspension attachment protrusion proximate the upper edge region;
  - a second suspension attachment protrusion proximate the lower edge region; and
  - a harness attachment element comprising a hook and extending downwardly from the lower edge region and configured to releasably attach to the first or second strap portions of the harness assembly;
- wherein the first and second suspension attachment protrusions are spaced and configured to releasably attach to the hardhat suspension of the hardhat and configured to contact opposing sides of the lateral strap of the hardhat suspension wherein, for both the first and second harness adapters, the lateral strap comprises a loop, and the hook is connectable with the loop.

14. The respiratory protection assembly of claim 13, wherein, for both the first and second harness adapters, the first and second suspension attachment protrusions extend outwardly from the first major surface.

15. The respiratory protection assembly of claim 13, wherein the first harness adapter is a mirror of the second harness adapter.

* * * * *